J. HARRIS.
WELDING TORCH.
APPLICATION FILED SEPT. 13, 1915.
1,291,864.
Patented Jan. 21, 1919.
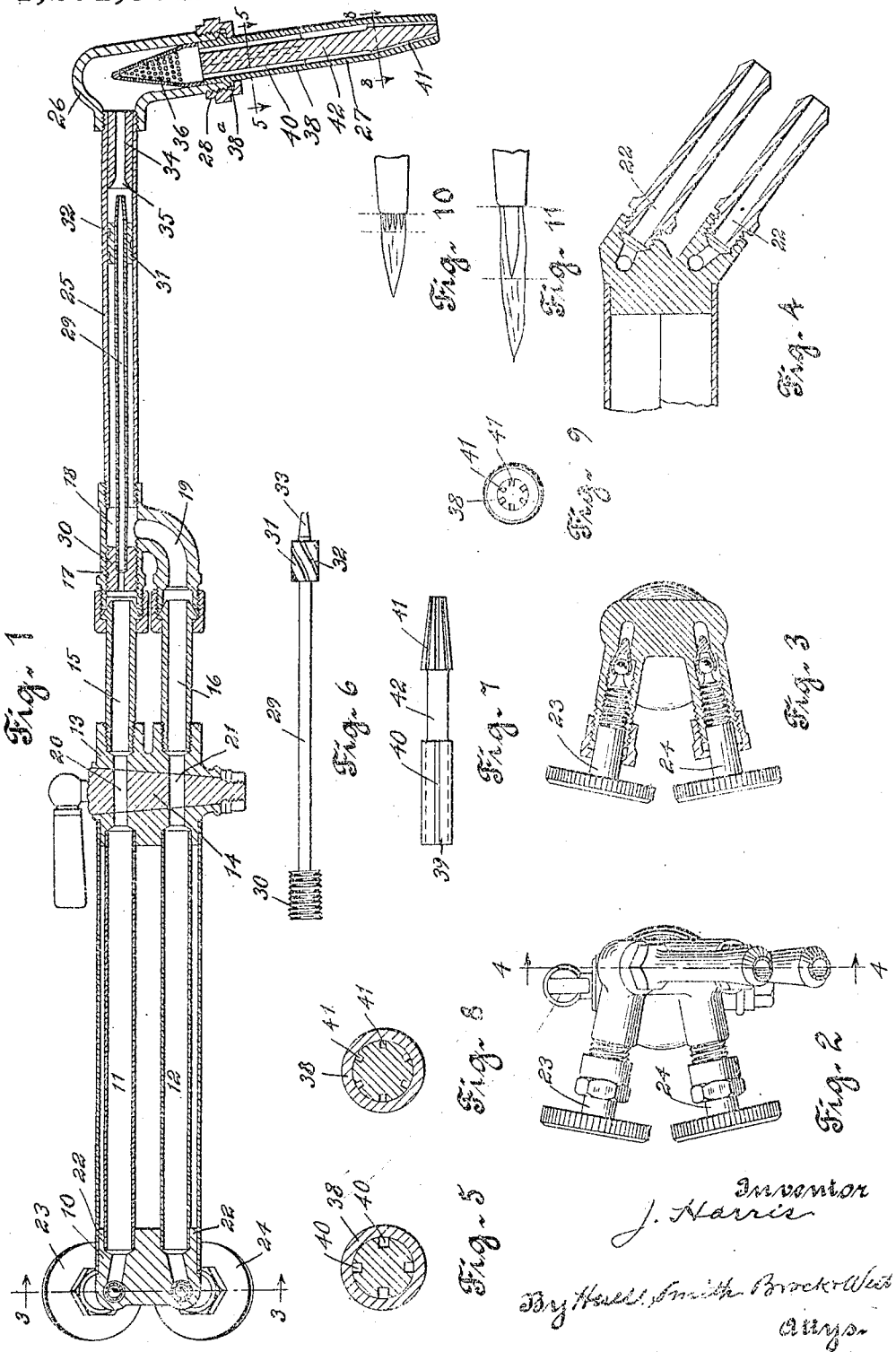
Inventor
J. Harris

UNITED STATES PATENT OFFICE.

JOHN HARRIS, OF CLEVELAND, OHIO, ASSIGNOR TO THE CARBO HYDROGEN COMPANY OF AMERICA, OF PITTSBURGH, PENNSYLVANIA, A CORPORATION OF DELAWARE.

WELDING-TORCH.

1,291,864.  
Specification of Letters Patent.  
Patented Jan. 21, 1919.

Application filed September 13, 1915. Serial No. 50.305.

*To all whom it may concern:*

Be it known that I, JOHN HARRIS, a citizen of the United States, residing at Cleveland, in the county of Cuyahoga and State of Ohio, have invented a certain new and useful Improvement in Welding-Torches, of which the following is a full, clear, and exact description, reference being had to the accompanying drawings.

This invention relates generally to burners or torches for the purpose of accomplishing what is known as autogenous or heterogenous welding of metals through the proper combustion of oxygen and another gas in such proportions as will produce a neutral flame, and the invention relates more particularly to certain improvements upon the torch shown, described and claimed in my application No. 877,648 filed December 17, 1914.

The present invention, embodying many of the features of that application accomplishes all of the results possible of accomplishment with that torch and in addition has for its object to provide a torch which will be much quicker and more efficient in its operation.

In welding torches as heretofore constructed the opening at the end of the tip through which the commingled gases emerge is of considerable diameter in order to obtain a flame of sufficient magnitude, and it is well known that the hottest portion of the flame is at the forward end of what may be termed the "inner cone" of the flame at which point the combustion is as near perfect as possible, and this inner cone or intense portion of the flame is always surrounded by an enveloping portion of lower temperature, due to the fact that the flame, burning in the air, is more or less chilled by the presence of inert nitrogen.

Increasing the size of the orifice at the end of the tip produces a somewhat longer cone in the flame and places the welding point farther from the tip and consequently more air contacts with the flame and tends to cool the same, as it gives the air a chance to commingle with the flame.

The object of my invention, therefore, is to increase and intensify the welding flame without increasing the enveloping or reducing portion of the flame. I have discovered that in burning a combustible mixture composed of oxygen and a combustible gas, (such as hydrogen), the best results are obtained when the commingled gases are discharged through an orifice of the size known as U. S. gage 51, or U. S. gage 53, and I have further discovered that by grouping these discharge orifices at the end of the tip I am able to produce an intense heating flame equal to practically the aggregate of the number of discharge orifices, when the said discharge orifices are so grouped as to prevent the formation of a reducing or enveloping flame between them, there being but one enveloping or reducing flame for the aggregated flames at the end of the tip.

My invention broadly stated therefore, consists in providing a welding torch tip with a series of apertures or passages of a suitable size and through which the commingled gases are discharged and burned at the tip, said orifices or passages being so grouped as to provide an aggregated welding flame at the end of the tip.

My invention also has for its object to provide a removable head and a removable tip, and also a novel construction of mixing chamber; and the invention consists in certain features of construction and combination of parts hereinafter fully described whereby these and other objects are accomplished.

In the drawings forming a part of this specification Figure 1 is a sectional view of a torch constructed in accordance with my invention. Fig. 2 is a rear end elevation; Fig. 3 is a sectional view on the line 3—3 of Fig. 1; Fig. 4 is a detail sectional view on the line 4—4 of Fig. 2; Fig. 5 is a detail sectional view on the line 5—5 of Fig. 1; Fig. 6 is a detail view of the oxygen tube with spacing means; Fig. 7 is a detail view in elevation of the filler for the tip; Fig. 8 is a detail sectional view on the line 8—8 of Fig. 1. Fig. 9 is end of tip. Figs. 10 and 11 show diagrams of flames.

As the means for supplying and controlling the oxygen and combustible gas, (such as hydrogen) are substantially the same as those shown and described in the application before referred to I will only briefly refer to those parts, and describe in detail the novel features of construction. In the drawings 10 indicates a casting to which the oxygen pipe 11, and the combustible gas pipe 12, are connected, said pipes leading into the casing 13, having a cock or valve 14 arranged therein, and short sections of pipe 15 and 16 are also connected to this casing 13, the forward ends of the pipes 15 and 16 being united to a coupling 17 by suitable gaskets, which coupling 17 has a straight passageway 18, and a curved passageway 19, communicating with the curved passageway 18 at the forward end thereof.

The rotary plug or valve 14 has passageways 20 and 21 which establish communication between the pipes 11 and 15, and 12 and 16, respectively.

The casting 10 is provided with nipples 22 by means of which the pipes leading to the main supply are connected, and the casting 10 is provided with valves 23 and 24 for regulating the supply of gas to the pipes 11 and 12 respectively.

The commingling pipe 25 is screwed into the forward end of the coupling 17, and has a torch head 26 rigidly secured to its forward end, the lower end of the head having the tip 27 connected thereto by means of a collar or gasket 28.

A tube 29 adapted to convey oxygen is located within the commingling pipe 25 the rear end of said tube 29 being fixed in a bushing 30 which is secured into the coupling 17 at the rear end of the passage 18, so that the oxygen passing through the pipe 15 will enter the oxygen tube 29 which is positioned or centered within the commingling pipe 25 by means of a cylindrical spacing block 31 having peripheral grooves 32, preferably cut spirally so as to cause a circulation of the hydrogen or other combustible gas passing through the commingling pipe 25.

The oxygen tube 29 terminates a short distance from the forward end of the commingling pipe 25 and is tapered as shown at 33, and within the commingling pipe 25, in advance of the tapered end of the oxygen tube is a restricting bushing 34, the rear end thereof being made flaring as shown at 35 to facilitate the entrance of the combustible gas and the oxygen thereinto, the commingled gases passing through this restricting bushing into the hollow torch head 26, which constitutes a mixing chamber wherein the gases are thoroughly commingled preparatory to being passed to the tip, and within this hollow head 26 is arranged a foraminous or perforated cone 36, the apex thereof being nearest the inlet end of the hollow head. The commingled gases pass through this cone before entering the tip and in doing so are broken up and commingled more intimately than would otherwise be the case were this perforated cone omitted.

The tip 27 preferably consists of an outer sleeve or shell 38 and a filler 39, the inner end of the sleeve or shell being provided with an exterior annular shoulder 38ª which is engaged by the gasket 28 for connecting to torch head. The outer end of this sleeve or shell is slightly contracted and the outer end of filler 39 is tapered to exactly conform to the shape of the sleeve or shell. Longitudinal grooves or slots 40, are produced in the upper or inner portion of the filler and the smaller grooves or slots 41 in the tapered portion of the filler, the intermediate portion being reduced as shown at 42, and by means of this construction the commingled gases which are thoroughly mixed in the hollow head 26, after passing through the perforated cone pass through the slots, grooves or passageways 40, into the annular space due to the reduced portion 42 and then through the smaller grooves or passageways 41 to the end of the tip where they are burned; the ends of the filler and shell being in the same plane and by means of this construction I provide a plurality of small orifices or jet openings at the extreme end thereof grouped about the center of said tip and discharging the commingled or mixed oxygen and a combustible gas (such as hydrogen) with the result that a plurality of intensely hot flames are produced the whole being enveloped by a single reducing flame of less length or size than would be the case were each jet separate and elongated.

These grooves or passages 41 produced in the tapered end of the filler are of the U. S. gage 53 or U. S. gage 51, previously referred to, and the jet openings at the end of the tip are therefore of this gage as the sleeve or shell enveloping the grooved filler provides the plurality of jet openings at the end of the top as most clearly shown.

I am thus able to obtain approximately the aggregated heat of the various aggregated flames for the reason that there is only one enveloping reducing flame, and the jet openings are so close together as to prevent intermediate enveloping and reducing flames.

It is obvious from the description and illustration that the tip can be quickly and easily removed and another substituted when desired and the head can likewise be quickly and easily removed from the commingling pipe and a new one substituted when needed, and in fact all of the parts can be disconnected and new ones substituted whenever occasion may require. I have illustrated and described that embodiment of my invention which actual experience has proven to be efficient, but it will be understood that the tip and head can be modified or changed, within the scope of the claims, without departing from the broad principles of my invention.

It will thus be seen that I provide an exceedingly simple and highly efficient construction of welding torch capable of carrying out and accomplishing all of the objects hereinbefore referred to.

Having thus described my invention, what I claim is:

1. In a welding torch, a tip comprising a shell or sleeve, and an imperforate filler arranged therein, said filler being reduced intermediate its ends, the inner and outer portions of said filler being longitudinally grooved whereby there is provided at the inner and outer ends of the tip passages for conveying the commingled gases, the center of said tip being imperforate.

2. In a welding torch, a tip comprising a shell or sleeve, the interior diameter of which tapers toward the outer end, and a filler shaped to fit snugly within the said shell or sleeve, the intermediate portion of said filler being reduced in diameter, the inner and outer portions of said filler being grooved longitudinally and adapted to provide with the shell or sleeve, a plurality of passages for conveying the commingled gases.

3. In a welding torch, a tip comprising a shell or sleeve, the interior diameter of which tapers toward the outer end, and a filler shaped to fit snugly within the said shell or sleeve, the intermediate portion of said filler being reduced in diameter, the inner and outer portions of said filler being grooved longitudinally and adapted to provide with the shell or sleeve, a plurality of passages for conveying the commingled gases, the grooves at the outer end of the filler being of less cross sectional area than those at the inner end.

4. In a welding torch, the combination with a mixing chamber having a foraminous cone arranged therein, the apex of said cone extending toward the inlet end of said mixing chamber, of a tip attached to said mixing chamber and comprising a sleeve or tube and a filler arranged therein, the surface of one of said members being grooved whereby a plurality of gas passages are produced when said sleeve and filler are placed together, the central portion of said filler being imperforate.

5. In a welding torch, a tip comprising a shell or sleeve the interior diameter of which tapers toward the outer end, and a filler shaped to fit snugly within said shell or sleeve, the intermediate portion of one of said members being cut away, those portions of said member not cut away being grooved longitudinally and adapted to provide, when the two members are placed together, a plurality of passages for conveying the commingled gases.

6. In a welding torch, a tip comprising a shell or sleeve, the interior diameter of which tapers toward the outer end, and a filler shaped to fit snugly within said shell or sleeve, the intermediate portion of one of said members being cut away, the inner and outer portions of said cut-away member being grooved longitudinally and adapted to provide with the other member a plurality of passages for conveying the commingled gases, the grooves at the outer end of the member being of less cross sectional area than those of the inner end.

In testimony whereof, I hereunto affix my signature in the presence of two witnesses.

JOHN HARRIS.

Witnesses:
CHAS. E. BROCK,
EDWARD EVERETT.